United States Patent [19]
Reuter et al.
[11] Patent Number: 4,780,042
[45] Date of Patent: Oct. 25, 1988

[54] MELTING CRUCIBLE TILTING MECHANISM

[75] Inventors: Wolfgang Reuter, Niddatal; Oskar Tippmann, Maintal, both of Fed. Rep. of Germany

[73] Assignee: Leybold-Heraeus GmbH, Cologne, Fed. Rep. of Germany

[21] Appl. No.: 57,221

[22] Filed: Jun. 2, 1987

[30] Foreign Application Priority Data

Apr. 1, 1987 [DE] Fed. Rep. of Germany ....... 3710911

[51] Int. Cl.$^4$ ........................ B65G 65/04; B65G 65/36
[52] U.S. Cl. ........................................ 414/421; 74/30
[58] Field of Search .................... 414/421; 74/30, 109, 74/842

[56] References Cited

U.S. PATENT DOCUMENTS

| | | | |
|---|---|---|---|
| 2,558,612 | 6/1951 | Falk | 74/30 |
| 2,626,071 | 1/1953 | Smith | 414/421 |
| 3,137,402 | 6/1964 | Gunn, Jr. | 414/421 |
| 3,575,057 | 4/1971 | Kurowski | 74/30 |
| 3,726,029 | 4/1973 | Deen et al. | 74/30 |
| 4,116,251 | 9/1978 | Graney | 74/30 |
| 4,182,203 | 1/1980 | Drury | 74/30 |

*Primary Examiner*—Lawrence J. Oresky
*Attorney, Agent, or Firm*—Felfe & Lynch

[57] ABSTRACT

A tilting mechanism for precisely controlling the pouring of metal from a melting crucible is disclosed. The mechanism utilizes a pressure roller journalled in an adjustable bearing mount to clearance-free urge a rack against a pinion to tilt the crucible. At least one boom is disposed on the adjustable bearing mount to pivot the hydraulic cylinder in a parallel direction relative to the tilting shaft.

3 Claims, 2 Drawing Sheets

Figure 1:
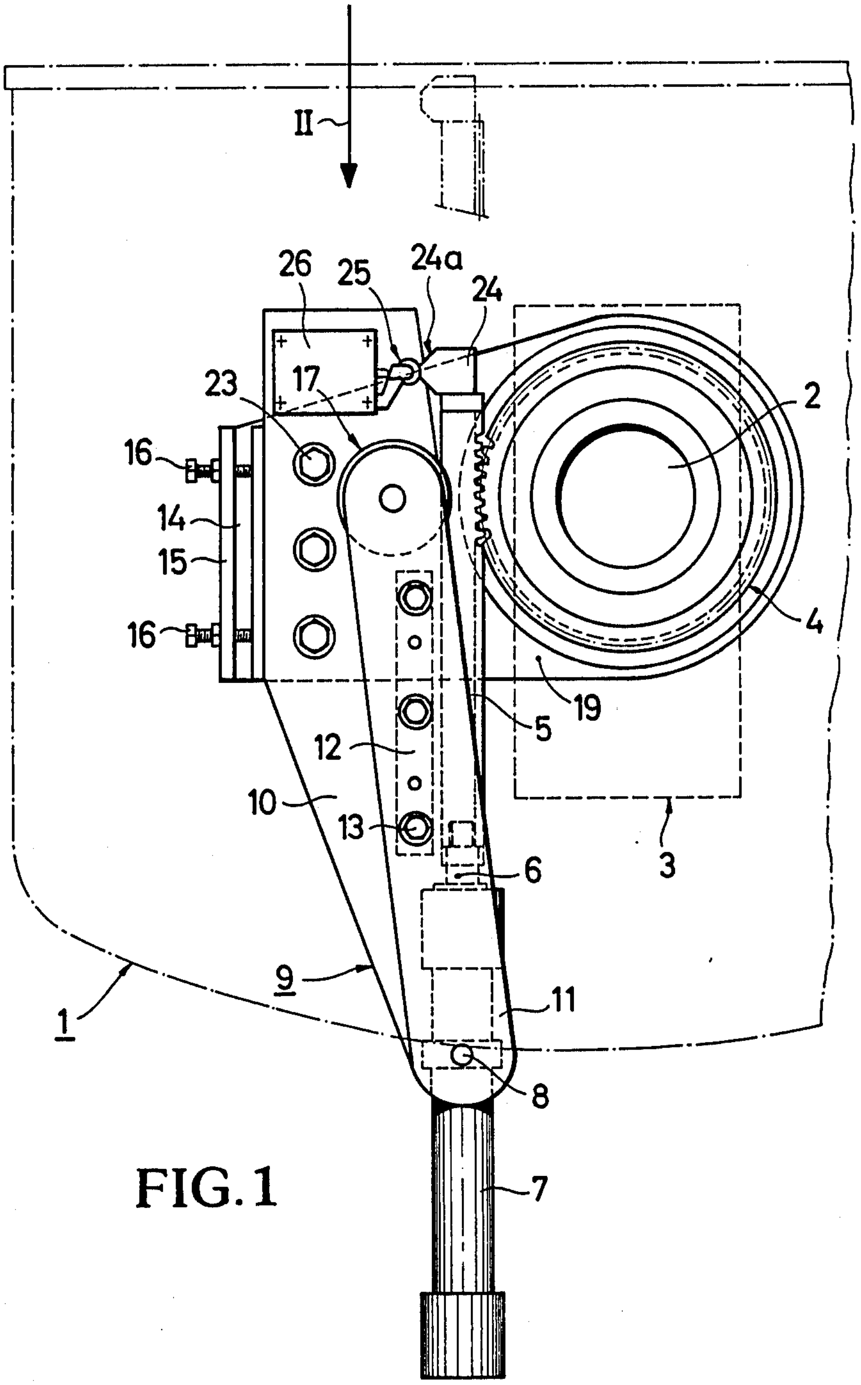

FIG. 2
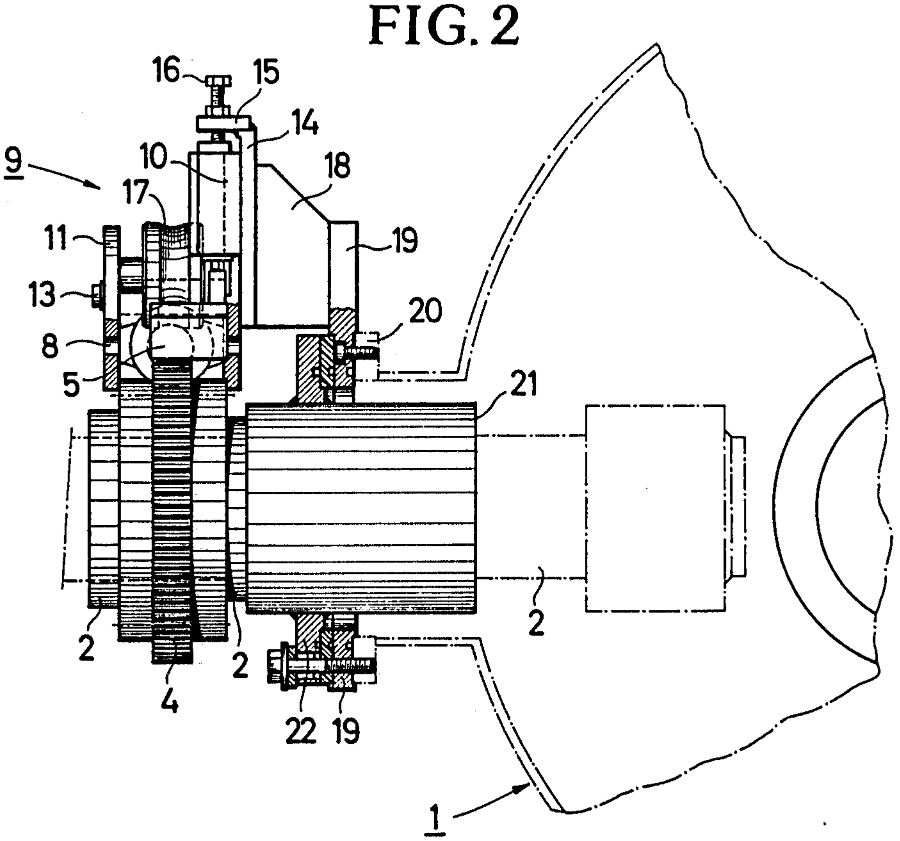
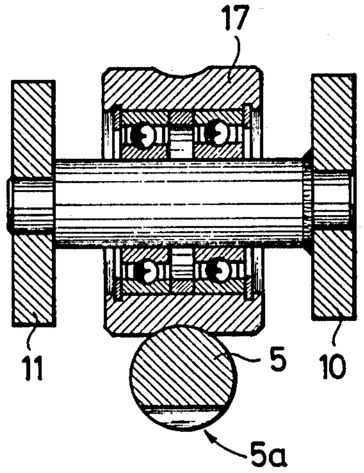
FIG. 3

MELTING CRUCIBLE TILTING MECHANISM

The invention relates to a tilting mechanism for melting crucibles suspended on a horizontal shaft, which has a pinion affixed to the shaft, and a rack meshing with the pinion and directly fastened to the piston rod of a hydraulic cylinder.

In known tilting mechanisms the rack is urged against the pinion by an adjustable slide shoe. This slide shoe has a tendency to stick, so that a jumpy movement of the rack could not be reliably prevented. Furthermore, the hydraulic cylinder was fixedly mounted, so that the rack directly connected to the piston rod was exposed to a slight extent to resilient deformations. For the control of teeming operations in which a very specific amount of the metal must be poured per unit time from the crucible, such tilting mechanisms are virtually unusable.

The invention is therefore addressed to the problem of devising a tilting mechanism of the kind described above, with which the melting crucible can be moved at a precisely predefined angular velocity from the beginning of the tilting movement to the end of the teeming.

The solution of the stated problem is accomplished according to the invention by a pressure roller journaled in an adjustable bearing mount for the clearance-free urging of the rack against the pinion and by at least one boom disposed on the bearing mount for mounting the hydraulic cylinder to enable the latter to swivel about a pivot shaft parallel to the tilting shaft.

By means of the invention, the pressure roller, rack, piston rod and hydraulic cylinder are moved in the same sense and simultaneously in the radial direction to the pinion, so that no resilient deformations of rack and/or piston rod can occur. The use of a pressure roller instead of a slide shoe leads to the prevention of unstable transitions between sliding and sticking (so-called "slip-stick effect").

An embodiment of the invention will now be explained in detail with reference to FIGS. 1 to 3.

FIG. 1 shows a side view of the complete tilting mechanism as seen in the direction of the tilting shaft, and FIG. 2 is a top view of the tilting mechanism of FIG. 1 as seen in the direction of the arrow II, on a smaller scale, and FIG. 3 is a cross section through the pressure roller and its bearing on an enlarged scale.

A melting chamber 1 of a vacuum casting apparatus is represented in FIG. 1 by a dash-dotted outline. In this melting chamber is represented a melting crucible 3, which is not visible from this viewing direction, is [suspended] from a tilt shaft 2, and can be rotated counterclockwise from its position, represented by broken lines, for the purpose of pouring.

Mounted on the tilt shaft 2 for co-rotation therewith is a pinion 4 which is engaged tangentially by a rack 5, which is directly joined to a piston rod 6 of a hydraulic cylinder 7. The hydraulic cylinder 7 is pivoted on a pivot shaft 8 in a bearing mount 9 which consists of a carrying plate 10 and a holding plate 11 which accommodate the hydraulic cylinder 7 between them and form a downwardly pointing boom (referring to FIG. 1). Carrying plate 10 and holding plate 11 are held at a given distance apart from one another by a spacer 12 represented in broken lines, the fastening being accomplished by a row of screws 13.

As best seen in FIG. 2, the carrying plate 10 is in turn displaceably fastened to a stationary supporting plate 14 which has a flange plate 15 through which two adjusting screws 16 are passed. In this manner it is possible to displace the bearing mount 9 in a plane parallel to the plane of drawing in FIGS. 1 and 2. The pivot shaft 8 also participates in this displacement.

Between the carrying plate 10 and holding plate 11 there is furthermore journaled a pressure roller 17 which acts on the side of the rack 5 facing away from the teeth 5*a*. Details can be seen more clearly in FIG. 3. As a result of the journaling of the pressure roller 17 in the same bearing mount 9, the pressure roller 17 also participates in the movement of the bearing mount, so that the movement of the rack and of the hydraulic cylinder that drives it is always in the same sense and of the same magnitude.

The support plate 14 in turn is fastened to a mounting plate 19 by a bracket 18, the mounting plate being bolted to an annular flange 20 which in turn is affixed to the melting chamber 1. Through the wall of the melting chamber 1 is passed a hermetic vacuum lead-through 21 which is fixedly bolted through an annular flange 22 both to the mounting plate 19 and to the annular flange 20. The vacuum seal 21 serves simultaneously as a pivot bearing for the tilting shaft 2. After appropriate adjustment by the adjusting screws 16, the carrying plate 10 and holding plate 14 can be clamped together by means of screws 23.

The direction of the axis of the hydraulic cylinder 7 and thus the direction of movement of the rack 5 can be arbitrarily chosen—for example, the direction of movement can even be horizontal. For position indicating purposes, a cam 24 with a curved surface **24*a* is disposed on the free end of the rack 5 and acts upon the plunger 25 of a limit switch 26**.

We claim:

1. A tilting mechanism for moving a melting crucible of a melting chamber comprising:
   (a) a tilting shaft having a first end and a second end extending in a substantially horizontally direction away from the melting chamber, the first end of the tilting shaft attached to the melting crucible;
   (b) a pinion affixed to the second end of the tilting shaft;
   (c) a rack tangentially engaging the pinion;
   (d) a hydraulic cylinder attached to the rack by means of a piston rod; and the rack is rigidly attached to the piston rod;
   (e) an adjustable bearing mount to which the hydraulic cylinder is pivotably affixed;
   (f) means to adjustably move the adjustable bearing mount towards and away from said pinion by a selected amount;
   (g) at least one boom means affixed to the adjustable bearing mount for pivotally mounting the hydraulic cylinder on a pivot axis which is spaced from and parallel to the tilting shaft; and
   (h) a pressure roller mounted in the adjustable bearing mount to contact said rack and urge the rack against the pinion in a clearance-free manner.

2. The tilting mechanism according to claim 1, wherein the boom means extends in a substantially downward direction relative to the tilting shaft, and comprises a carrying plate and a holding plate which accommodate the hydraulic cylinder between them.

3. The tilting mechanism according to claim 2, wherein the boom means further comprises means for spacing apart the carrying plate and the holding plate.

* * * * *

UNITED STATES PATENT AND TRADEMARK OFFICE

CERTIFICATE OF CORRECTION

PATENT NO. : 4,780,042

DATED : October 25, 1988

INVENTOR(S) : Wolfgang Reuter et al.

It is certified that error appears in the above-identified patent and that said Letters Patent is hereby corrected as shown below:

Col. 2, line 40 "horizontally" should read -- horizontal --;

Signed and Sealed this

Second Day of May, 1989

*Attest:*

DONALD J. QUIGG

*Attesting Officer*

*Commissioner of Patents and Trademarks*